United States Patent [19]

Sondermann

[11] 4,258,021
[45] Mar. 24, 1981

[54] METHOD OF PRODUCING $UO_2$ WHEREIN METHANOL WASH IS PROVIDED

[75] Inventor: Thomas Sondermann, Kahl, Fed. Rep. of Germany

[73] Assignee: Reaktor-Brennelement Union GmbH, Hanau, Fed. Rep. of Germany

[21] Appl. No.: 908,954

[22] Filed: May 24, 1978

[30] Foreign Application Priority Data

Jun. 6, 1977 [DE] Fed. Rep. of Germany ....... 2725534

[51] Int. Cl.³ .................... C01G 1/02; C01G 56/00
[52] U.S. Cl. .................................... 423/261; 423/253
[58] Field of Search .............................. 423/261, 253

[56] References Cited

U.S. PATENT DOCUMENTS

| 3,755,188 | 8/1973 | Grossman et al. | 423/261 X |
| 3,842,155 | 10/1974 | Muller et al. | 423/261 X |
| 3,963,828 | 6/1976 | Becker | 423/261 |

OTHER PUBLICATIONS

Perry et al., (Eds.), *Chemical Eng. Handbook*, 5th Ed., 1973, pp. 13-50 to 13-55.

*Primary Examiner*—Richard E. Schafer
*Attorney, Agent, or Firm*—Herbert L. Lerner

[57] ABSTRACT

In the production of $UO_2$, ammonium uranyl carbonate is an intermediate product wet with water and contaminated with ammonium carbonate and is washed with methanol to remove water and ammonium carbonate. The spent methanol containing 50% water and up to 10% ammonium carbonate is subjected to rectification in a column under subatmospheric pressure with cooling the top of the tower to a low temperature to retard decomposition of ammonium carbonate and condense a liquid water fraction. Clogging of the column, vapor lines and condenser by recombination of the decomposition products is prevented. The purified methanol contains less than 5% water and may be returned for further washing of ammonium uranyl carbonate.

5 Claims, 1 Drawing Figure

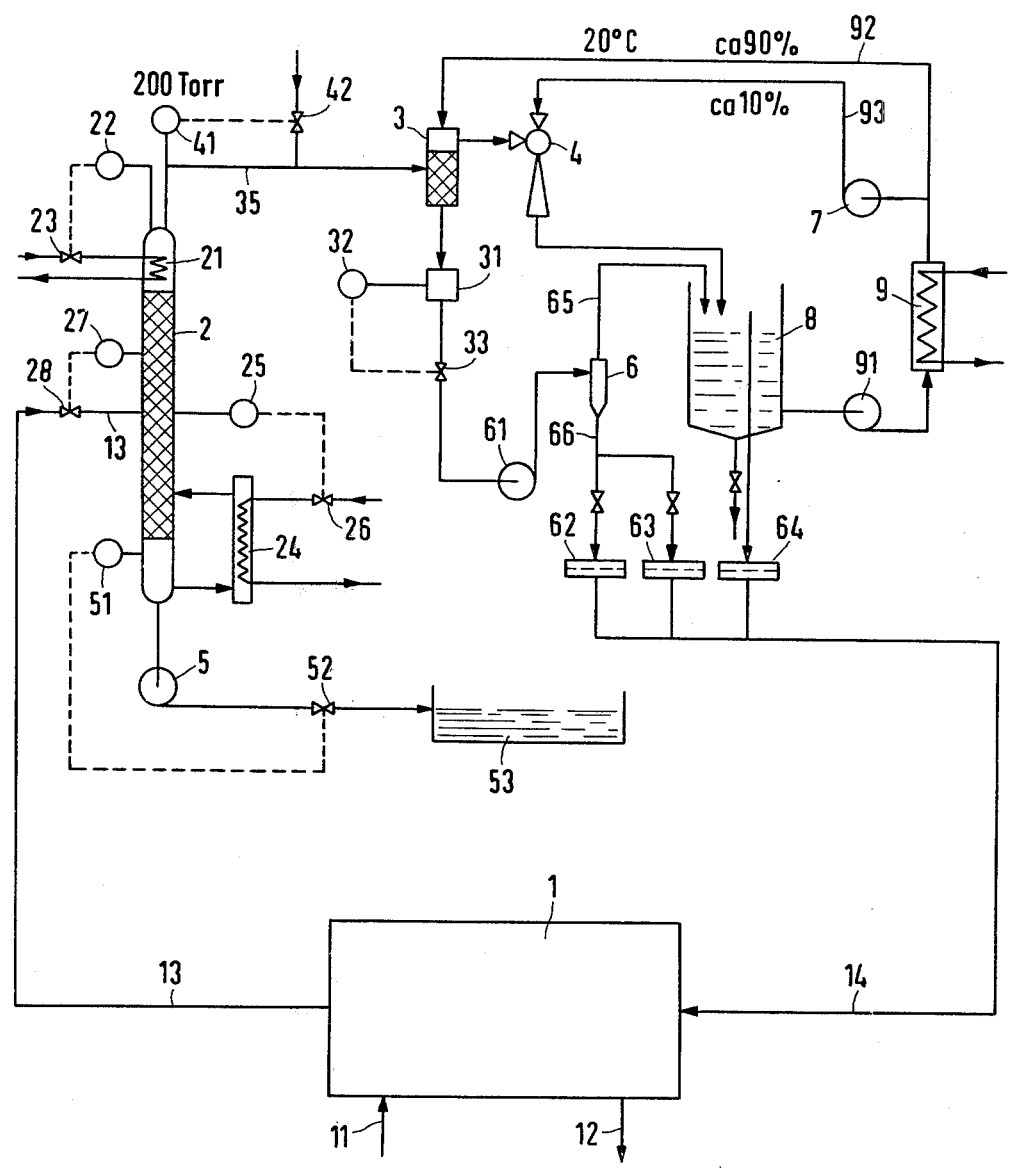

METHOD OF PRODUCING UO₂ WHEREIN METHANOL WASH IS PROVIDED

BACKGROUND OF THE INVENTION

1. Field of the Invention

This invention relates to the production of $UO_2$ in which ammonium uranyl carbonate (AUC) is a wet intermediate contaminated with ammonium carbonate, and washed with methanol to purify and dehydrate the AUC.

2. Description of the Prior Art

A method is known for the production of $UO_2$, in which ammonium uranyl carbonate (AUC) is obtained as an intermediate product precipitated from an aqueous solution, and is washed as well as dehydrated by means of methanol. Such a method has been proposed in the German Published Non-Prosecuted Application 2 222 527; it has as its purpose to dehydrate the AUC and to reduce its fluorine content.

The methanol after use for this purpose, has absorbed approximately 50% water and also contains up to 10% ammonium carbonate. It furthermore is radioactive due to small quantities of uranium and daughter elements of uranium (thorium 234).

It is not possible to recover the methanol by customary distillation methods, as the ammonium carbonate content would clog up the rectification column and especially the condenser in a very short time.

SUMMARY OF THE INVENTION

An object of the present invention is to provide a recovery method for the methanol, which does not clog up the rectification column and condenser which requires no addition of chemicals and furthermore presents no waste removal problems.

With the foregoing and other objects in view, there is provided in accordance with the present invention a method for the production of $UO_2$ in which ammonium uranyl carbonate is precipated from an aqueous solution and separated as a contaminated wet product containing ammonium carbonate, the contaminated wet ammonium uranyl carbonate washed with methanol to remove contaminates and dehydrate the ammonium uranyl carbonate, and the purified ammonium uranyl carbonate converted to $UO_2$, including passing the methanol containing water and ammonium carbonate as impurities resulting from washing the contaminated ammonium uranyl carbonate to a rectification column, subjecting the impure methanol to fractional distillation in the column wherein the impure methanol is heated to vaporize it with the release of vapor from the top of the column and the discharge of liquid from the bottom of the column, condensing the released vapor and returning at least a portion of the condensate for washing contaminated wet ammonium uranyl carbonate.

In accordance with the present invention there is provided a method for the production of $UO_2$ in which ammonium uranyl carbonate is precipitated from an aqueous solution and separated as a contaminated wet product containing ammonium carbonate, the contaminated wet ammonium uranyl carbonate washed with methanol to remove contaminates and dehydrate the ammonium uranyl carbonate, and the purified ammonium uranyl carbonate converted to $UO_2$, including passing the methanol containing water and ammonium carbonate as impurities resulting from washing the contaminated ammonium uranyl carbonate to a rectification column, subjecting the impure methanol to fractional distillation in the column wherein the impure methanol is heated to vaporize it with the release of vapor from the top of the column and the discharge of liquid from the bottom of the column, maintaining the column under subatmospheric pressure, cooling the top of the column to a low-temperature to condense a liquid water fraction in the vapor and retard decomposition of ammonium carbonate contained in the column top to prevent subsequent recombination of the decomposition products, and retain the bulk of the ammonium carbonate in solution in the liquid water fraction, releasing methanol vapor containing less than 5% water and a minor amount of ammonium carbonate from the top of the column, and discharging liquid water containing dissolved ammonium carbonate and less than 5% methanol from the bottom of the column.

Other features which are considered as characteristic for the invention are set forth in the appended claims.

Although the invention is illustrated and described herein as embodied in method of producing $UO_2$ wherein methanol wash is provided, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing, which diagrammatically illustrates the operation of the process in accordance with the present invention.

DETAILED DESCRIPTION OF THE INVENTION

The spent methanol from washing the ammonium uranyl carbonate is purified via a distillation facility with rectification under subatmospheric pressure and purified methanol is returned to the scrubbing system for further washing of wet contaminated ammonium uranyl carbonate. This low-pressure rectification furthermore uses cooling the head of the dephlegmator, i.e., cooling the top of the rectification column. Also methanol vapors from the rectification column are run into a mixing condenser into which is fed cooled, condensed, final methanol distillate. Crystallized substances, ammonium carbonate, are separated by filtration from the condensed methanol vapors and the separated crystals of ammonium carbonate returned to the $UO_2$ production process.

This new method according to the invention will be explained in further detail in the following with the aid of the attached FIGURE which shows a schematic functional diagram.

The scrubbing plant for washing the AUC with methanol is designated by numeral 1. The intermediate product in the production of $UO_2$, wet AUC, is fed-in through the line 11 into methanol scrubbing plant 1. The dried AUC resulting from scrubbing with methanol is conducted away through the line 12 for conversion into $UO_2$. Purified methanol, i.e., methanol containing less than 5% water and less than 1% ammonium carbonate, by weight, preferably less than 0.25% is fed through line 14 to plant 1. The spent methanol, which contains up to 50% water, is discharged through the line 13 and introduced into the rectification column 2, which may be any suitable fractionating tower filled with packing such as Berl saddles or may be of the bubble-cap type. This used or spent methanol contains, in addition to water, ammonium carbonate and free ammonia as well as about 1% by weight $NH_4F$ or $NH_4NO_3$.

The ammonium carbonate content of the spent methanol is appreciable and may constitute 10% by weight. This necessitates a special method, as with normal distillation, the carbonate is decomposed and, the decomposition products would normally recombine to clog up the top of the column of head cooler 21 of the column 2. This is precluded in the method according to the invention by the provision that the distillation column operates at reduced pressure preferably about 175–225 Torr, desirably about 200 Torr, and the column head 21 is designed as a water separator by cooling to a low temperature, preferably about 30°–45° C. desirably about 38° C. to condense a liquid water fraction and retard decomposition of ammonium carbonate. The final condensation of vapor released through line 35 from column 2 takes place in a wet condenser 3, to which methanol distillate cooled below 20° C. is fed. These three special measures prevent combination of ammonium carbonate crystals, since at the low head temperature and the subatmospheric pressure in accordance with the invention, material decomposition of the ammonium carbonate will not occur, and substantially all the solid ammonium carbonate will be retained in solution in the liquid water fraction. Minor amounts of ammonium carbonate, usually a fraction of a percent may be carried with the vapor as, for example, by entrainment. The final condenser, the wet condenser 3, into which the vapor containing such minor amount of ammonium carbonate enters, cannot get crusted over as it has no heat exchange surfaces since cooling is effected by direct contact with cold methanol distillate entering through line 92.

The process cycle can be explained in detail as follows:

The methanol liquor to be processed, which comes from the scrubbing plant 1, is fed through the line 13 to the rectification column 2. The amount of methanol to be supplied is dosed via the valve 28 as a function of the column temperature, which is monitored via a conventional measuring device 27. The liquid in the sump of the column 2 is heated and vaporized by a steam-heated, forced-circulation evaporator 24, the amount of steam being set via the valve 26 as a function of the column temperature by means of conventional measuring device 25. Liquid from the sump of the column 2 is pumped off by pump 5. The liquid level in the sump of column 2 is controlled by conventional filling level measuring device 51, with the valve 52 controlled by the latter. The residue or bottoms in the sump of column 2, contains less than 5% methanol, and is sent by pump 5 to the collecting tank 53.

The vapors rising in the column are condensed in the head cooler 21 by passing cooling water entering through valve 23 in indirect heat exchange with the vapors. The amount of cooling water is regulated by the conventional measuring device 22 which controls the opening of the valve 23. Good results are obtained when the column 2 had an operating temperature at the head of about 38° C. and an operating pressure of about 200 Torr. The pressure is controlled via the manometer 41 and the valve 42, through which air is admitted into the system if required.

The vapors leaving the top of the column 2, flow out through the line 35 to the wet condenser 3, where the vapors are condensed with recovered methanol coming from the line 92. This methanol is cooled to below 20° C. by means of a cooler 9. The wet condenser 3 is further connected to an ejector 4, which is likewise supplied with recovered methanol via the line 93 and the pump 7. This ejector 4 generates the lower pressure in the system. The wet condenser 3 is followed by a small intermediate tank 31. The latter is equipped with a filling level control device 32 which controls the discharge valve 33. The pump 61 pumps the methanol coming from the condenser 3 together with any crystallized particles of ammonium carbonate suspended in the methanol to a hydro-cyclone 6 which separates the solid particles from the liquid. The liquid substantially free from crystals flows via the line 65 to the collecting tank 8, into which the liquid leaving the ejector 4 also runs. The liquid which leaves the hydro-cyclone 6 via the line 66 and is heavily enriched with crystals is directed alternatingly to the filters 62 and 63. The purified liquid leaving these filters, i.e., the recovered methanol, then flows through the line 14 to the AUC scrubbing plant 1 for re-use. The overflow from the collecting tank 8 flows into the collecting line 14 for the methanol distillate via a standard settling filter 64. This closes the circuit. The distillate, i.e., the end product, has a methanol concentration of more than 95%. The residues alternatingly deposited in the filters 62 and 63, consist suubstantially of ammonium carbonate, and may be returned to the AUC production process.

It is evident from this description that it is possible in a relatively simple manner and without further chemical additives, to purify the spent scrubbing methanol and to process it for re-use in the scrubbing plant. The methanol losses are extremely small, so that this method is highly advantageous also from the economic point of view.

There is claimed:

1. In the production of $UO_2$ in which ammonium uranyl carbonate is precipitated from an aqueous solution and separated as a contaminated wet product containing ammonium carbonate, the contaminated wet ammonium uranyl carbonate washed with methanol to remove contaminates and dehydrate the ammonium uranyl carbonate, and the purified ammonium uranyl carbonate converted to $UO_2$, the improvement comprising passing the methanol containing water and ammonium carbonate as impurities resulting from washing the contaminated ammonium uranyl carbonate to a rectification column, subjecting the impure methanol to fractional distillation in the column wherein the impure methanol is heated to vaporize it with the release of vapor from the top of the column and the discharge of liquid from the bottom of the column maintaining the column under subatmospheric pressure within the range of 175–225 Torr, cooling the top of the column to a low-temperature within the range of 30°–45° C. to condense a liquid water fraction in the vapor and retard decomposition of ammonium carbonate contained in the column top to prevent subsequent recombination of the decomposition products, and retain the bulk of the ammonium carbonate in solution in the liquid water fraction, releasing methanol vapor containing less than 5% water and a minor amount of ammonium carbonate from the top of the column, condensing the methanol vapor released from the top of the column by direct intimate contact with a colder liquid methanol distillate, passing condensed methanol-containing crystals through a filter, to remove the crystals, and returning at least a portion of the methanol after separation of the crystals for washing contaminated wet ammonium uranyl carbonate, and discharging liquid water containing dissolved ammonium carbonate and less than 5% methanol from the bottom of the column.

2. Method according to claim 1, wherein the top of the column is cooled by indirect heat exchange with a cooler cooling medium to a temperature of about 38° C. and the column maintained at a pressure of about 200 Torr.

3. Method according to claim 1, wherein the mixture of condensed methanol vapor and liquid methanol distillate is passed through a hydrocyclone to separate the mixture into a liquid fraction free of crystals such as ammonium carbonate and a liquid fraction containing crystals such as ammonium carbonate, passing the liquid fraction containing crystals through a filter, to remove the crystals, and returning at least a portion of the methanol free of crystals for washing contaminated wet ammonium uranyl carbonate.

4. Method according to claim 3, wherein a portion of methanol free of crystals is cooled and introduced in direct intimate contact with the methanol vapor released from the top of the column to condense the vapor.

5. Method according to claim 3, wherein a portion of methanol free of crystals is cooled and introduced as a motive fluid into an ejector in communication with the column to maintain subatmospheric pressure in the column.

* * * * *